(No Model.)

I. C. HOWES.
NUT FOR SCREW BOLTS.

No. 392,731. Patented Nov. 13, 1888.

Witnesses.
M. L. Adams.
A. M. Jones.

Inventor
Isaiah C. Howes,
Per Edw. E. Quimby,
Atty.

UNITED STATES PATENT OFFICE.

ISAIAH C. HOWES, OF EAST ORANGE, NEW JERSEY.

NUT FOR SCREW-BOLTS.

SPECIFICATION forming part of Letters Patent No. 392,731, dated November 13, 1888.

Application filed September 21, 1888. Serial No. 285,970. (No model.)

*To all whom it may concern:*

Be it known that I, ISAIAH C. HOWES, of East Orange, New Jersey, have invented certain Improvements in Nuts for Screw-Bolts, of which the following is a specification.

The object of this invention is to enlarge the wrench-bearing and thus strengthen the wrench hold upon the nuts used on railroad-track bolts employed to secure joints provided with angle-plates.

It consists in making the front end of the nut square, but convergently chamfering those of the edges which in an ordinary nut would be parallel with its axis, so that the radial sweep of the chamfered edges, when the nut is turned, will describe the surface of a truncated cone, the angle of the side of which to its truncated end will correspond approximately with the angle of the lateral portion of the angle-plate to its vertical portion. By this construction the front portion of the nut is enlarged, and a bearing of greater width and greater radius is provided for the wrenches used to screw the nut on or off the bolt.

Figure 1:
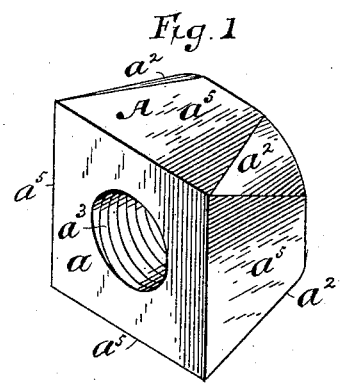
Figure 2:
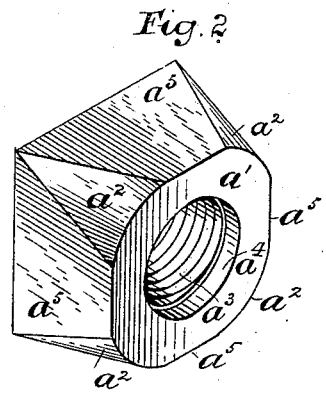
Figure 3:
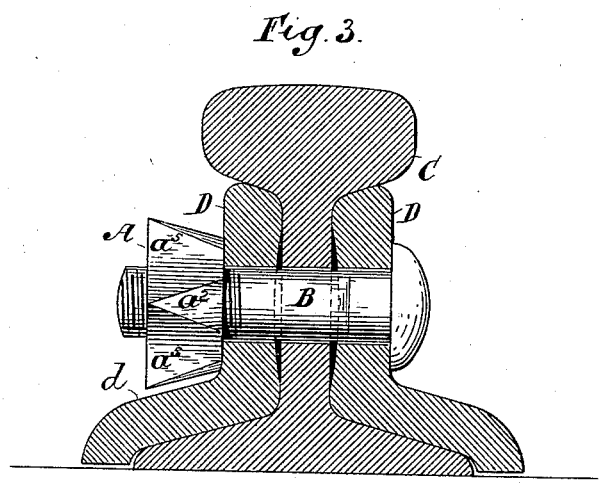

The accompanying drawings, illustrating a nut embodying the invention and showing the manner of its employment upon a track-bolt used to secure a joint provided with angle-plates, are as follows:

Figure 1 is an isometrical perspective exhibiting the larger, or, as it is herein called, "front," end of the nut. Fig. 2 is an isometrical perspective exhibiting the smaller end of the nut—that is, the end which is intended to bear against the object through which the bolt is inserted. Fig. 3 is a transverse section of a railroad-track joint provided with angle-plates, showing in elevation one of the track-bolts, and the improved nut applied thereto.

The drawings illustrate the invention embodied in a nut provided upon its inner end with a recess, as shown and described in Letters Patent of the United States No. 341,146, dated May 4, 1886, granted to Frank H. Howes.

The front end, $a$, of the nut A is square. Its opposite end, $a'$, which is intended to bear against the object through which the bolt is inserted, is octagonal or approximately circular by reason of the presence of the chamfered edges $a^2$ $a^2$ $a^2$ $a^2$, the chamfering being convergent from points at or near the front end, $a$, toward the opposite ends, $a'$, of the nut.

The hole through the nut is provided with the usual screw-thread, $a^3$, and at its inner end may, if desired, be provided with the recess $a^4$.

It will be seen that the nut has four relatively rectangular faces, $a^4$ $a^4$ $a^4$ $a^4$, which meet each other only at or near the front end of the nut, and that the sides of the rectangular faces meet the sides of the chamfered faces, respectively.

In Fig. 3 the nut A is represented as applied to a bolt, B, which is inserted transversely through the web of a rail, G, and through the vertical portions of the angle-plates D D.

It will be seen that the progressive variation in the extreme radius of the nut corresponds approximately to the progressive variation in the vertical distance between the bolt and the inclined surface $d$ of the angle-plate, the nut being so proportioned that those parts of it which are of the greatest radius will have the necessary clearance from the inclined surface $d$ of the angle-plate when the nut is screwed home, as shown in Fig. 3.

What is claimed as the invention is—

1. For employment with a screw-bolt, a polygonal nut having four relatively rectangular faces meeting each other only near the front end of the nut, and having its edges convergently chamfered from the places of meeting of the said rectangular faces toward the end of the nut which is to bear against the object through which the bolt is inserted.

2. In a railroad-track joint employing the angle-plate D, the combination, as herein set forth, of a bolt, B, and the inclined lateral portion $d$ of the angle-plate D, with a polygonal nut having four relatively rectangular faces, and having its edges convergently chamfered from points near its front end toward the end of the nut which bears against the vertical portion of the angle-plate, as and for the purpose set forth.

ISAIAH C. HOWES.

Witnesses:
 CHARLES HALSEY,
 M. L. ADAMS.